(12) United States Patent
Parker, Jr. et al.

(10) Patent No.: US 12,021,702 B2
(45) Date of Patent: Jun. 25, 2024

(54) METHOD AND APPARATUS FOR OPTIMIZED ROUTING AND DEPLOYED RESOURCE ALLOCATION USING ARTIFICIAL INTELLIGENCE

(71) Applicant: T. White Parker Associates, Incorporated, Sterling, VA (US)

(72) Inventors: Lloyd Parker, Jr., Oakton, VA (US); Lisa Williams, Ashburn, VA (US); Prashant Shuklabaidya, Arlington, VA (US)

(73) Assignee: T. White Parker Associates, Incorporated, Sterling, VA (US)

( * ) Notice: Subject to any disclaimer, the term of this patent is extended or adjusted under 35 U.S.C. 154(b) by 61 days.

(21) Appl. No.: 17/843,784

(22) Filed: Jun. 17, 2022

(65) Prior Publication Data
US 2022/0417105 A1    Dec. 29, 2022

Related U.S. Application Data

(60) Provisional application No. 63/213,974, filed on Jun. 23, 2021.

(51) Int. Cl.
| | | |
|---|---|---|
| *H04L 41/12* | (2022.01) | |
| *H04L 41/16* | (2022.01) | |
| *H04L 45/00* | (2022.01) | |
| *H04L 45/12* | (2022.01) | |
| *H04L 47/762* | (2022.01) | |
| *H04L 47/78* | (2022.01) | |

(52) U.S. Cl.
CPC .............. *H04L 41/12* (2013.01); *H04L 41/16* (2013.01); *H04L 45/123* (2013.01); *H04L 45/563* (2013.01); *H04L 47/762* (2013.01); *H04L 47/781* (2013.01)

(58) Field of Classification Search
CPC ........ H04L 41/12; H04L 41/16; H04L 45/123
See application file for complete search history.

(56) References Cited

U.S. PATENT DOCUMENTS

| | | | |
|---|---|---|---|
| 11,469,983 B1* | 10/2022 | Malov ................... | H04L 41/142 |
| 2007/0299946 A1* | 12/2007 | El-Damhougy ........ | H04L 67/12 709/223 |

* cited by examiner

*Primary Examiner* — Adnan M Mirza
(74) *Attorney, Agent, or Firm* — Michael P. Fortkort, Esq.; Protorae Law PLLC

(57) ABSTRACT

An artificial intelligence enhanced method for optimizing operational deployment of field resources using network Voronoi Tessellations in combination with the aggregation and consideration of numerous data elements. Resources deployed in the field utilize modes of transportation that are represented by a network topology, which can be influenced by external sources of information that pertain to nodes in the network or nodes in other network topologies, which can be used by an artificial intelligence processor to develop optimized routes for deployed field resources in a continuous manner. The incorporation of these sources of information that can influence the topology of the network is utilized to determine the optimal deployment of field resources.

20 Claims, 10 Drawing Sheets

(a) The ZVD (left) and DZVD (right) for the wind field $\omega_1$.

(b) The ZVD (left) and DZVD (right) for the wind field $\omega_2$.

METHOD AND APPARATUS FOR OPTIMIZED ROUTING AND DEPLOYED RESOURCE ALLOCATION USING ARTIFICIAL INTELLIGENCE

RELATED APPLICATION

This non-provisional patent application claims priority to and the benefit of U.S. Provisional Patent Application No. 63/213,974 filed Jun. 23, 2021 by the same inventors and with the same title. U.S. Provisional Patent Application No. 63/213,974 is hereby incorporated by reference as if repeated herein in its entity, including the drawings.

BACKGROUND

The present invention relates, generally, to methods and apparatuses for optimizing the allocation of deployed resources and, more particularly, to a method and apparatus for optimizing the routing and allocation of deployed resources across a predetermined territory.

Many organizations deploy staff to a large number of fixed locations. Inefficiencies abound in existing techniques that rely on mostly manual and historical techniques for deploying this staff to various locations at which the staff are needed. No system exists to optimally route deployed staff to a large number of fixed locations, especially one that maximizes the experience for the deployed staff, considers the deployed staff's home base location (i.e., and the assumed desire to end closest to home), dynamic traffic patterns, and the relation of each individual staff member in relation to all other active deployed staff.

The present invention is, therefore, directed to the problem of developing an automated method for optimally allocating a routing method that considers several factors including starting location, dynamic traffic patterns and location of staff relative to each other.

SUMMARY OF THE INVENTION

The present invention solves these and other problems by providing an automated route optimizer and optimized fixed node assignment system that utilizes Artificial Intelligence (AI)-enabled methods to consider all routing variables (e.g., both static and dynamic) in real-time. The present invention offers the flexibility to plan routing using any predetermined unit of time intervals, as it occurs today, with the added benefit of suggested alterations available in near real-time, which consider dynamic factors such as road closures and traffic patterns.

Thus, optimizing route planning offers the following benefits:
1. Enables consideration of the routing process as a holistic "system" (e.g., collection of stops or nodes on a route, total active workforce, collective skill-set of each deployed staff member, and the daily routing process):
   Considers collective progress of all nodal activities in its determination of the best resources (e.g., most available and appropriate) to route to the next nodal point;
   Incorporates the ability to aggregate and consider groupings of nodal points by type, priority, etc.; and
   Receives inputs from the collective body of deployed staff to inform route planning and the identification of systemic findings concerns/risks that may impact or influence routing priority.
2. Maximizes collective deployed staff productivity and facilitates capture of domain specific knowledge elements that increase the precision with which routing occurs by the system over time:
   Ability to establish and learn about nodes based on unplanned events or other priorities;
   Learns routing preferences (e.g., as deployed staff accept or opt to manually route themselves to assigned nodes) of deployed staff to continuously minimize travel time and distance;
   Enables global prioritization of nodes top down (e.g., management-driven) and bottom up (e.g., staff driven); and
   Introduces the ability to quantify the importance/weighting of any node thereby informing its nodal priority.
3. Improves deployed staff experience as single optimized "system" of traveling capacity optimized to achieve mission as efficiently as possible:
   Creates an automated "Fixed Base Operator or FBO" for deployed staff to plan their routes, obtain the latest traffic routing suggestions, and view system generated recommendations for plan changes;
   Provides a centralized system to input knowledge that affects nodal planning and decision making
   Provides real-time consideration of dynamic events and constraints that may impact the decision on the next nodal point; and
   Gives ability to "opt out" of a suggested node due to personal factors.
4. Offers potential for cost savings across the collective process:
   Reduced travel distances and associated costs; and
   Improved routing given ability to consistently consider all variables in near real-time.
   A systematic approach offers operational efficiency and precision to the nodal planning process.

The present invention provides a centralized driven neural network for node routing enabled by artificial intelligence. The present invention integrates with proximate data systems, datasets, and tools to further the simultaneous achievement of nodal mission maximization with the concurrent optimal allocation of assets, such as those involved in any application requiring the deploying of deployed staff to a number of fixed nodes.

The present invention enables driving deployed staff optimization in a manner that optimizes efficiency and enables more dynamic node management and planning. The present invention includes algorithms to determine how to accomplish optimized routing, as well as a complete system applying these algorithms to the dynamic factors involved in optimal routing (i.e., deployed staff once they start their day constantly move, and nodal assignments need the flexibility to move at a moment's notice based on broad factors influenced on both a localized and national level).

The present invention utilizes methodologies from Artificial Intelligence (AI), Machine Learning, & Computational Geometry to provide consideration for the unspoken factors required to effectively manage nodal prioritization proactively and precisely. The invention will utilize both structured and unstructured data as appropriate.

The system of the present invention will generate an automated Routing Plan (RP), a plan of recommended nodes for a given deployed staff member over a user defined period of time (e.g., 2-weeks, 4-weeks). During the travel period, the system provides continuous updates and adjusts the RP dynamically as factors evolve over the course of the day. The RP allows for dynamic update recommendations from the system as well as deployed staff-initiated updates. Any deviations from the suggested RP will be captured and "learned" by the system to inform future routing recommendations. The system continues to optimize even when presented with potential deviations from previously established RPs that inevitably occur as unplanned circumstances occur across active nodal networks (e.g., traffic incidents, deployed staff availability, high-priority node events). There is a baseline plan that is modified by the occurrence of unplanned events, the associated priority of which is tied to and determined by the final result of the combination of distances, traffic patterns, management priorities, etc., and this determination is consequently used to update the plan.

In contrast, when compared to how territory allocation occurs today the approaches, driven by manual effort and individual knowledge, introduce variability, inconsistency, and an inability to optimally consider all dynamic factors that impact routing. Additionally, they lack the cohesion to permit a "system-wide" action based on a high-priority (e.g., an all-hands-on-deck response or a system-wide stop order). Through the infusion of supervisor/deployed staff input, Artificial Intelligence (AI), Machine Learning (M/L), and Computational Geometry, the system of the present invention will enable the establishment of a neural network of knowledge regarding routing that systematically gets smarter as time progresses thereby enabling event-by-event optimization. Because the system continues to "learn" from the collective inputs of all supervisors and deployed staff, over time, if offers the foundation for a neural network of intelligent routing and management.

The system of the present invention utilizes, at its core, Voronoi Tessellation, which allocate territories based on where each deployed staff member of the system resides at any given point-in-time. This provides the central concept for how the system changes the concept of an individual deployed staff member into a singular dynamic system. As indicated in FIGS. 11 and 12—with the calculation of each successive nodal point, the system considers where each deployed staff member is at that specific point in time to determine the best person to route to the next node. A minute later, when it is time to determine who goes to the next node, the system does the calculation again, redrawing the territorial boundaries to achieve the optimal routing option. This continuous consideration of deployed staff current location in reference to each activity occurring at each node provides the nucleus for dynamic, optimized routing.

Since the system dynamically allocates territories and assigns nodes in real-time, it closely interfaces with the mechanisms by which communication of said nodal events gets relayed to staff in the field, whether human or technological in nature. Due to this, the geolocation data of deployed staff, as they perform their activities, significantly informs the definition of territorial boundaries given the geolocation of every other deployed staff member at a singular point-in-time. As staff get more accustomed to utilizing the system and interact with it more regularly, they gain the increasing benefit of its suggested optimized routing recommendations.

The lists below outline the benefits and derived metrics possible using the present invention.

Benefits of the Present Invention over Existing Approaches:
1. Minimizes transportation costs,
2. Simultaneous consideration of both static and dynamic data elements,
3. Ability to inform (with supporting data), the quantity of deployed staff needed, by defined regional areas,
4. Intelligently generated routing recommendations for each deployed staff member throughout the workday,
5. Ability to capture performance data on nodal activity previously unattainable.

Strategic Metrics Captured from the Use of the Present Invention:
1. Ability to evaluate time spent and distance traveled;
2. Cost savings through analysis of selected vs. system recommended nodes (thereby continuously optimizing system recommendations);
3. Data on average times to perform specified task across all staff performing said tasks; and
4. Quantity of nodal activity performed over time.

While the benefits enumerated herein constitute significant value, additional benefits will arise as the intelligent system of the present invention gets smarter, analysis of the available resulting data obtained takes place, and additional questions arise. In this way, the intelligent system of the present invention provides a foundation upon which any stakeholder may opt to further mature its thinking about its overall nodal network.

The present invention includes the flexibility needed to incorporate the outputs of other available data and/or systems. The incorporation of such elements may result in substantial improvements in the outcomes produced by the system of the present invention. As an example, inclusion of stakeholder driven, criteria-based prioritization (e.g., risk-based) would yield relevance, thereby making the present invention paramount to the achievement of business strategic outcomes. The incorporation of traffic volume estimation is also vital as it enhances the ability of the system to enable increased efficiency in asset allocation. It is essential to keep in mind that the flexibility inherent to the framework enables the potential incorporation of other factors as constraints into its optimization routines.

The present invention accomplishes the following:
Allows for supervisors and deployed staff input in the planning of routes, while preserving the ability to provide an optimized system-generated routing for consideration,
Offers an open and flexible design to enable future interface with related systems and capabilities currently under development,
Collect knowledge about the respective nodal processes as well as insights from deployed staff to help continuously tune system performance and precision,
Consider the impact of pertinent real-world factors such as environmental trends and traffic flow patterns,
Incorporate deployed staff attributes (e.g., home locations, nodal selections, preferred nodal event types, etc.) and enable them to designate their availability,
Permit the ability to directly control node event priority either top down or bottom up thereby instantly increasing the relevance of particular nodes based on any number of considerations (e.g., traffic patterns and node prioritization).

To illustrate how the system performs in the field, the following scenario illustrates the improved efficiency gained using the system of the present invention.

Scenario—Safety Inspection Example—where Inspectors Serve as the "Mobile Staff"

In this scenario—we consider a railroad inspector with a qualitative and safety focus. The deployed staff role is thus, that of an inspector and their nodal responsibility is an inspection site. For the example, the $1^{st}$ inspector—"blue" is illustrated in FIG. 9 (top lane). FIG. 9 depicts a simulation of standard inspection planning versus the system of the present invention, which enables inspection planning and highlights the many variables automatically considered, in real time prior to determining the next optimal inspection event. This "systematic" look at the entire inspection system (e.g., inspectors, desired inspection events, dynamic inspector locations and territories) optimizes the territory allocation in a manner previously unattainable. A time-phased inspection plan is created by the supervisor with inputs from the inspectors. The plan for the day requires the blue inspector to go from home to inspection point A, a railyard, followed by location D, a railroad crossing and then to E another rail yard.

Given the static nature of this plan, the inspector's route to conduct the chosen inspections does not factor in any additional knowledge about changes that may impact the plan. As such, no consideration of the other inspectors and their locations, nor the roadways (or any associated delays) are considered real time. Also note, that the last inspection in the plan takes inspector blue furthest from home which, assuming this occurs toward the end of a workday, places the inspector in the worse possible traffic scenario. Additionally, the current method considers each inspector as an individual actor vs. considering all inspectors part of a single system. As a single system, if the blue inspector takes longer than anticipated at the current node, the system could opt to route a second inspector to the next node thereby optimizing staff utilization.

Considering the approach of the system of the present invention, inspection assignments come in a predetermined unit of time, but updates can be generated as often as necessary by engaging the system. The initial developed plan produces a complete system plan (e.g., to include all available inspectors) for manager/inspector validation. This plan includes consideration of all priorities and known constraints. As the inspection day arrives, the inspector can begin executing the plan, as established or check in with the system to see if there are any last-minute adjustments or recommended changes based on traffic or other dynamic factors.

As the inspector denotes completion of one inspection (e.g., through a designation in the tool or by virtue of requesting a route to the next inspection point), the inspector can compare the next optimized recommended inspection point with what is currently in their plan and decide on whether to accept the change or not. Through the rules of the tool, the system can handle dynamic territory considerations (e.g., redrawn based on the inspector's location at the point of check-in) but will consider its base rules as constraints (e.g., not to go X number of miles away from home, place furthest point of travel toward the estimated middle of the day, and current road/traffic circumstances). Inspector blue now benefits from the option to obtain up-to-the-minute insight into the inspection plan (e.g., identifying inspection points at risk, seeing where other inspectors are operating, seeing real-time adjustments that are occurring, and submitting new intelligence into the system for consideration). The system will also produce a post-day synopsis that shows how its proposed routes compared to the route taken by each inspector. The considerations that caused the inspector to deviate serve as knowledge inputs to the AI engine for its use in future routing.

The present invention provides a mathematical solution that offers the standardization and repeatability unachievable by human actors but also offers the reliability and complete consideration for specialists' and inspectors' preferences.

To illustrate other applications of how the system could be used, the following examples are provided:

Fleet Management

The proposed technology can also solve the fleet management problem. In many scenarios, given knowledge of the total available assets, attempts to optimize fleet operations focus on controlling the number of available assets. The present solution also addresses the inversion of this problem by adding knowledge of operations/routes to the optimization equation. This additional consideration enables more precise optimization of fleets because it permits the ability to consider route dynamics (i.e., more assets needed during peak traffic hours).

During routine operations, this solution considers all assets in the fleet as a single system, thus, enabling the routing algorithm to consider resource proximity to the next nodal destination along with other routing factors to continuously achieve the most optimized routing possible (i.e., minimizing wasted time and resources). In other words, the technology optimizes using its knowledge of the total available assets, their global position (i.e., location), all required destinations, and all available travel routes to reach them. As circumstances impacting routes dynamically occur (i.e., traffic incidents and patterns), the technology automatically and optimally routes (and possibly re-routes) resources to automatically maintain real-time optimization.

Border Control

A total of nearly 7000+ miles of border territory must be covered by a fairly limited number of agents. The proposed technology can be leveraged to allocate and optimize agent coverage across borders to address the challenge of illegal immigration. In this instance, inputs to observed or suspected illegal border crossings can inform the routing of agents and/or help increase concentrations of officers in and around those locations to decrease emergency response times.

COVID-19 & Other Pandemic-Related Immunization

The United States of America is home to more than 330 million people. The current COVID-19 pandemic has precipitated a healthcare crisis the likes of which has not been seen in a long time. While there are efforts underway to deploy vaccines, the challenge that is yet unresolved is the effective administration of such vaccines—given that the land and population required to be covered is enormous and the number of medical professionals qualified to perform such operations and the vaccines themselves are severely limited. The proposed technology can be leveraged to allocate and optimize distribution of vaccinations across a predetermined area (e.g., a region, a country, the world).

The present invention combines the aggregation and consideration of numerous data elements (i.e., field resources, network topological nodes, external sources of information, etc.), and the use of Network Voronoi Tessellation to yield an optimized operational deployment of resources in the field.

There are several cases in which resources deployed in the field utilize modes of transportation that can be best represented by a network topology. The topology of this network can be influenced by various factors represented by external sources of information that may pertain to nodes in the network or nodes in other network topologies. The incorporation of these sources of information that can influence the topology of the network is utilized to determine the operational deployment of field resources.

Additionally, in many cases, there are distinct planning and operational stages. In both stages, given a finite number of field resources and their respective locations within the network topology utilized in the course of performing the activities associated with their operational deployment, there exist subsets of the network topology in question that fall under their respective purviews. These purviews are the result of the Voronoi Tessellation of the network topology, and for a given allocation, bring a number of nodes that are part of global deployment operations, and yield subsets of the network that fall under the purview of specific resources. Their generation is dependent on initial nodal locations of resources within the network topology. Within an initial assignment, the deployed resources use the network topology in question to perform operations that require transportation to potentially multiple nodes. This leads to a collection of possible sequences of transportation activities between all relevant nodes. These possible sequences constitute routes, and it is these routes that are optimized across all resources deployed in the field.

However, as these operations are often carried out by multiple resources simultaneously, the subsets of the network topology that fall under their respective purviews are correspondingly updated. This leads to certain nodes associated with deployment operations to no longer be under their purview, or others that were not in their purview to be included under their purview, leading to a recalculation of optimal routes based on this update of the subset of the network topology.

According to one aspect of the present invention, an artificial intelligence enhanced method for determining an optimal allocation of field resources includes several steps as follows. First, an initial network topology subset allocation is determined using network topology Voronoi Tessellation based on initial resource nodal location, resource geolocational data, external information, and primary network topology data. Next, an initial operational deployment route is generated based on the initial network topology subset allocation and an operational deployment plan. Deployment of field resources is then assigned based on the initial operational deployment route. Updated nodal locations are received from deployed field resources. An updated operational deployment route is recalculated based on the updated resource nodal locations, and additional external information. An updated network topology subset allocation is determined based on the updated operational deployment route. Another operational deployment route is recalculated based on the updated network topology subset allocation and new external information. The artificial intelligence enhanced method then returns to assigning field resources using the newly developed operational deployment route. This artificial intelligence enhanced method can be performed repeatedly to continuously develop optimal deployment routes based on new input and updated information from the field.

In the above exemplary embodiment, the artificial intelligence enhanced method may further include continuously developing optimal deployment routes based updated resource nodal locations.

In the above exemplary embodiment, the artificial intelligence enhanced method may further include repeatedly communicating updated deployment routes to the deployed field resources.

In the above exemplary embodiment of the artificial intelligence enhanced method, a calculation may be performed at each successive nodal point, during which consideration is given for where each deployed field resource is at that specific point in time to determine a best deployed field resource to route to a next node.

In the above exemplary embodiment of the artificial intelligence enhanced method, the optimized route calculation may be performed again when it is time to determine which deployed field resource goes to a next node, at which time territorial boundaries are then redrawn to achieve a new optimal routing option.

In the above exemplary embodiment, the artificial intelligence enhanced method provides dynamic, optimized routing for the deployed field resources by continuous consideration of a deployed field resource location in reference to each activity occurring at each node.

In the above exemplary embodiment, the artificial intelligence enhanced method may use traffic volume estimation to perform the optimized routing for the deployed field resources at each node.

In the above exemplary embodiment, the artificial intelligence enhanced method captures and learns from deviations from a suggested route plan to inform future routing recommendations.

According to yet another aspect of the present invention, a non-transitory computer readable media has stored thereon instructions causing an artificial intelligence processor to perform the above artificial intelligence enhanced method for determining an optimal allocation of field resources.

According to still another aspect of the present invention, an artificial intelligence enhanced apparatus determines an optimal allocation of field resources includes an artificial intelligence processor, a communications device or system, and several global positioning system devices. The artificial intelligence processor determines an initial network topology subset allocation using network topology Voronoi Tessellation based on initial resource nodal location, resource geolocational data, external information, and primary network topology data. The artificial intelligence processor generates an initial operational deployment route based on the initial network topology subset allocation and an operational deployment plan. The communications device or system is coupled to the artificial intelligence processor and sends to the field resources an assignment of the field resources based on the initial operational deployment route. The global positioning system devices are coupled to the communications device. Each of the global positioning system devices are deployed on one of the field resources, and determines a nodal location for its field resource. The communications system or device receives updated resource nodal locations from deployed field resources via the global positioning system devices and passes the updated resource nodal locations to the artificial intelligence processor. The artificial intelligence processor recalculates an updated operational deployment route based on the updated resource nodal locations, and additional external information. The artificial intelligence processor determines an updated network topology subset allocation based on the updated operational deployment route, and recalculates another operational deployment route based on the updated network topology subset allocation and new external information. The artificial intelligence processor continues to recalculate updated operational deployment routes based on updated resource nodal locations and additional external information using the newly calculated operational deployment route. The artificial intelligence processor continuously develops optimal deployment routes based on new input and updated information from the field, which is continuously communicated to the field by the communication device or system.

In the above exemplary embodiment, the artificial intelligence processor continuously develops optimal deployment routes based on new input and updated resource nodal locations.

In the above exemplary embodiment, the communication device repeatedly communicates updated deployment routes to the deployed field resources.

In the above exemplary embodiment, the artificial intelligence processor performs a calculation at each successive nodal point, during which consideration is given for where each deployed field resource is at that specific point in time to determine a best deployed field resource to route to the next node.

In the above exemplary embodiment, the artificial intelligence processor performs the optimized route calculation again when it is time to determine which deployed field resource to route to a next node, at which time territorial boundaries are then redrawn to achieve a new optimal In the above exemplary embodiment, the artificial intelligence processor continuously considers deployed staff current location in reference to each activity occurring at each node, which provides dynamic, optimized routing.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

Relevant Terms & Acronyms

RP: Routing Plan

Figure 1:
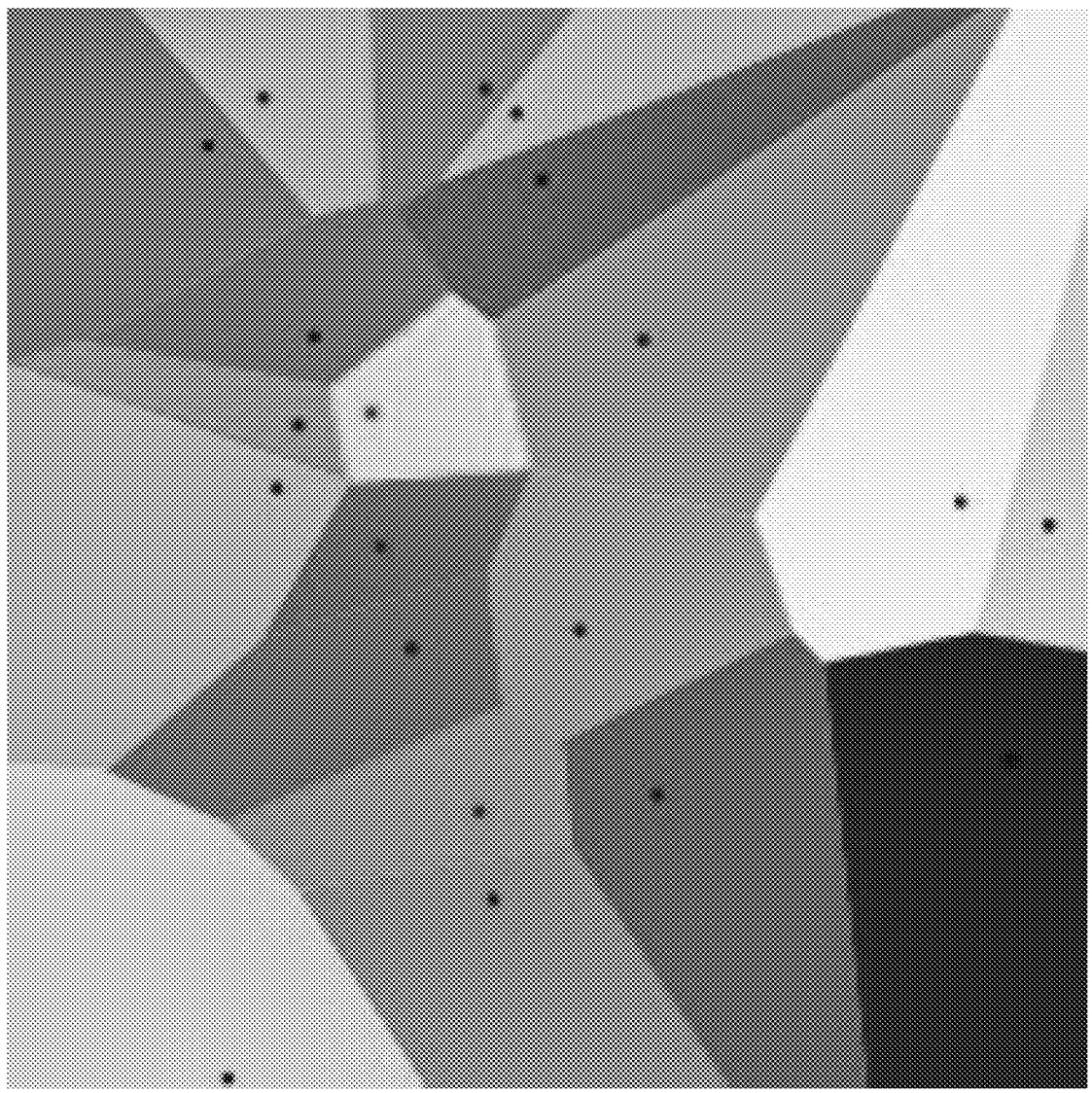
FIG. 1 depicts an example of the Voronoi Tessellation Diagram using Euclidean (flat) Distances between the locations of either field staff or destination nodes (Wikimedia Foundation, 2015).

Node: A single point within a given application that requires action by someone, the collection of which constitutes a nodal system of responsibility.

Euclidean Space: A two- or three-dimensional space in which the axioms and postulates of Euclidean geometry apply.

Voronoi Tessellation: A partition of a space into regions closest to each of a given set of objects.

Zermelo-Voronoi Tessellation: A special case of the Voronoi Tessellation

Orthodromic Distance: The great-circle distance, orthodromic distance, or spherical distance is the shortest distance between two points on the surface of a sphere, measured along the surface of the sphere (as opposed to a straight line through the sphere's interior).

Manhattan Distance: The distance between two points measured along axes at right angles.

Taxicab Geometry: A form of geometry in which the usual distance function or metric of Euclidean geometry is replaced by a new metric in which the distance between two points is the sum of the absolute differences of their Cartesian coordinates.

Edge: For an undirected graph, an unordered pair of nodes that specify a line joining these two nodes are said to form an edge. For a directed graph, the edge is an ordered pair of nodes.

Weighted Network Graph: A network where the ties among nodes have weights assigned to them.

Inspection Event Assignment System: A system, whether human or technological in nature, that assigns an inspection event to inspectors.

Optimizing the Allocation of Resources

The present invention addresses an ongoing challenge involving the most efficient way to manage a set of deployed staff (who are continuously moving) and the dispersed set of fixed points for which they are assigned responsibility. The present invention is meant to address how deployed staff are assigned in the most cost efficient and effective way to ensure that every node receives adequate focus.

There are various aspects and assumptions made as part of the design of the present invention:

- The manner in which a particular organization opts to segment/partition the land area of the United States (e.g., regionally, territorially, etc.);
- The manner in which nodes, to be acted upon by the deployed staff, are identified and prioritized;
- The geocoordinates of the nodes are static and do not change on a regular basis;
- Usage of the Taxicab Geometry is a better representation of how the deployed staff will travel compared to the standard distance metric of Euclidean geometry;
- Orthodromic distance will serve as an appropriate measure of distance;

"Mobile staff locations" and/or "Home Locations" refer to their original and/or normal residential or field office locations;

There may be unique methods used to assign nodes and priorities and must be accommodated by the system.

In determining the optimal routing approach and allocation, several factors help narrow the field of "optimal" solutions. Some of those factors include: How are distances measured?

What is the form of the space to be partitioned into nodal territories (e.g., is it flat or sphere shaped)?

How does the difference between relevant (e.g., roads and highways) and irrelevant (e.g., lakes, forests, mountainous areas) geographical features factor into the territory allocation process?

Territory Allocation Approaches

Provided herein is a scientific approach to efficiently divide an area based on travel distance. This method, employing a Voronoi Tessellation, provides the best geographical approach to the solution. A Voronoi Tessellation achieves the optimal division of a space based on a given set of points and distance metric. This results in each point being assigned a territory containing all the locations, which are closer to that point than to any other point. The uniqueness of this invention lies in the aggregation and consideration of numerous dynamic routing data elements (i.e., field staff, desired nodal points, traffic patterns), and the use of Voronoi Tessellation as part of the optimization algorithm to yield systematic routing optimization.

FIGS. 1-5 show examples of Voronoi diagrams, which represent the partitioning of a space achieved by this algorithm. The points in the figures represent the locations around which a space is broken into cells. In the context of the present application, the points could be deployed staff locations (e.g., Home Location or dynamic, based on physical location) or node locations (as defined by each user entity). At the end, we discuss Euclidean space definition.

Figure 2:
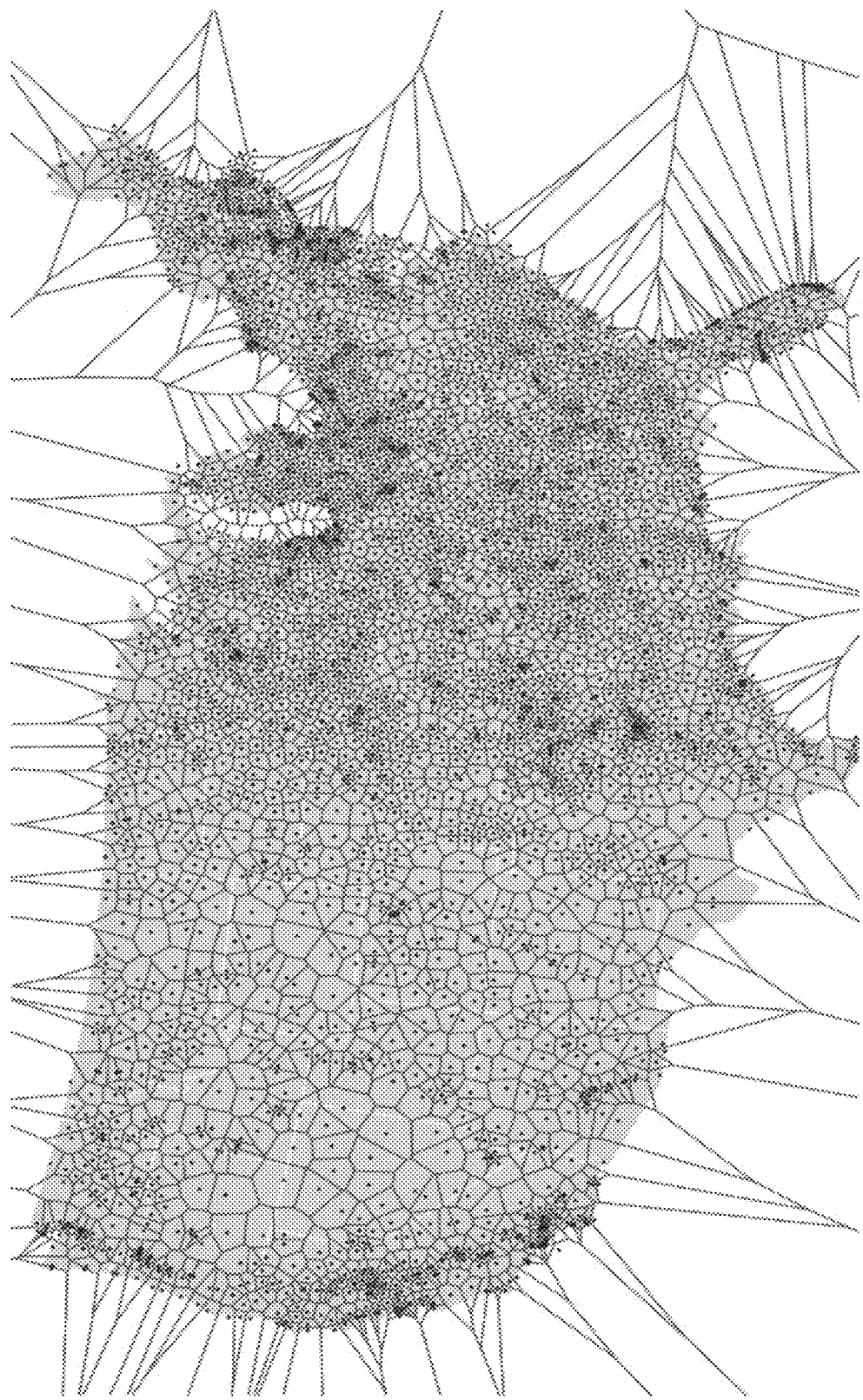
FIG. 2 depicts optimal allocation of flight service areas in the continental United States via a Voronoi Tessellation using airport locations as generator points (Bostock, 2011).
Figure 3:
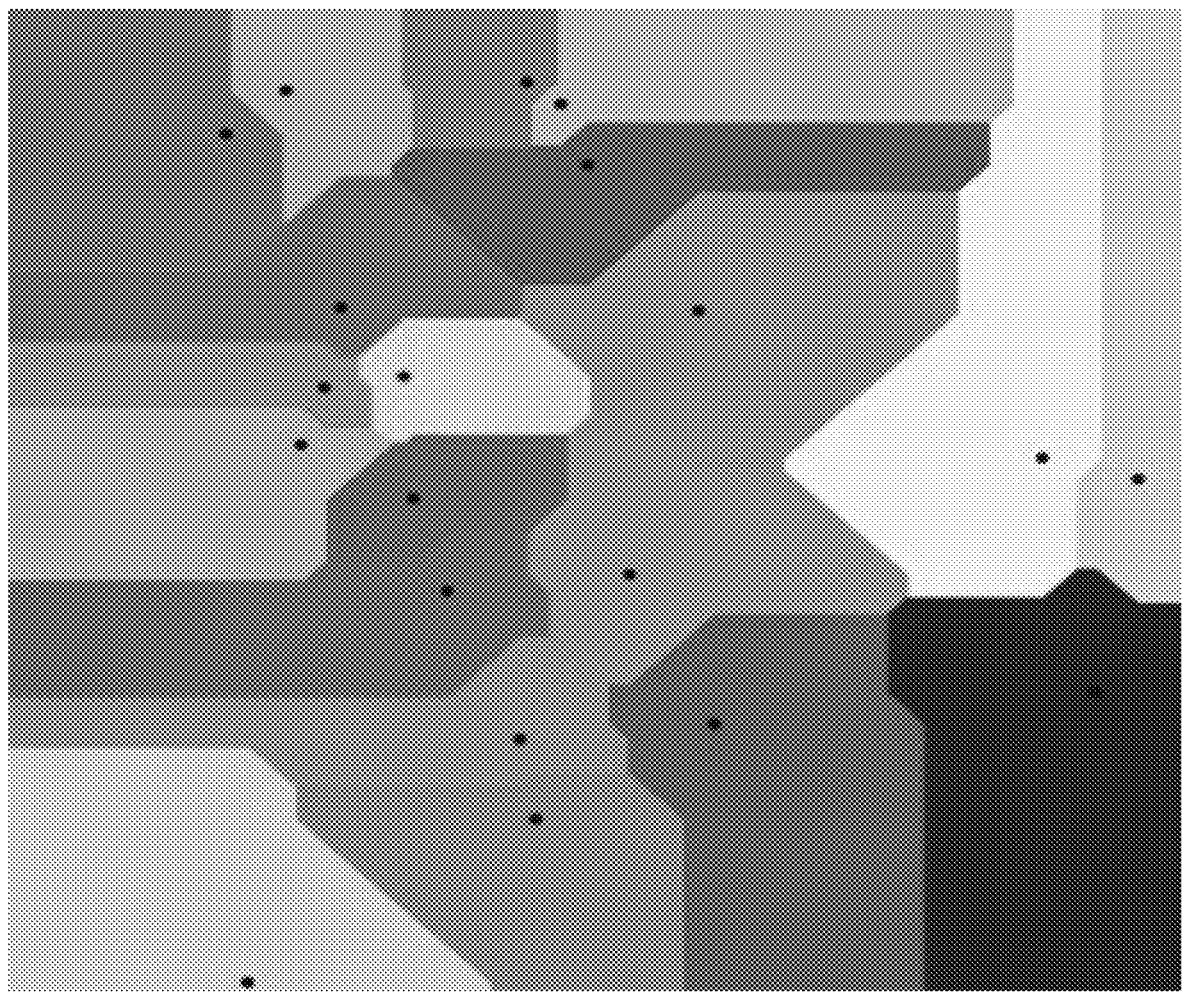
FIG. 3 depicts an example of the Voronoi Tessellation Process Diagram Using Manhattan Distance (Wikimedia Foundation, 2015).

Referring to FIG. 2, shown therein is a map of the continental United States featuring optimal flight service areas based on airport locations. To optimally partition a space, it is first necessary to determine how distance will be measured. As mentioned above, the Voronoi Tessellation algorithm requires both a set of generator points and a distance metric. The Manhattan Distance is an appropriate choice since it measures distances along a grid. If one was to reperform the Voronoi Tessellation used to produce FIG. 1 employing the Manhattan distance metric, one would achieve a new partitioning of the same space with the same generator points as shown in FIG. 3. At the end we define the Manhattan distance.

The Manhattan Distance provides a better representation of the cost (e.g., travel distance) involved in traveling between locations because deployed staff are confined to traveling on city/highway grids. Consequently, Tessellations using the Manhattan Distance achieve more efficient allocations of deployed staff territories.

In addition to identifying an appropriate method for measuring distance, one must also consider how to model the surface of the area being partitioned. In the above examples, the space was assumed to be a flat plane; however, a more rigorous approach requires accounting for the curvature of the Earth's surface. Distances between two points on the Earth's surface follow a curved path rather than a straight line, as illustrated in the diagram of a sphere shown in FIG. 4.

Failing to account for this curvature could lead to a suboptimal allocation of deployed staff territory assignments. To reduce complexity, one can assume the shape of the Earth to be perfectly spherical. Incorporating both the Manhattan distance approach and adjustments for the curved nature of the Earth's surface (refer to the end for the equation), one can attain a more nuanced approach to defining the area the deployed staff will travel.

This final consideration approaches the problem from a network theory perspective. This approach is predicated on the assumption that deployed staff rely on the U.S. Road and Highway system to travel to nodal locations. Based on this assumption, the U.S. Road and Highway can be modeled as a (weighted) network graph. Instead of treating the U.S. land mass as an open space over which deployed staff can travel freely, this model overlays a network on the space which more accurately represents travel pathways. Consequently, distance is measured along the network.

Under the weighted network graph framework, one has nodes, edges, and weights. The nodes of the network represent specific locations. The weights associated with the edges connecting adjacent nodes of the network represent the cost involved in traveling between the two geolocations that comprise the beginning and end points of such subsections. Additionally, the weighted network framework can conveniently incorporate granular network attributes, such as speed limits and expected traffic volumes. Thus, in addition to modeling transportation cost as distance (along the network), one can include more detailed adjustments which allow one to model cost with respect to both distance and travel time.

Figure 6:
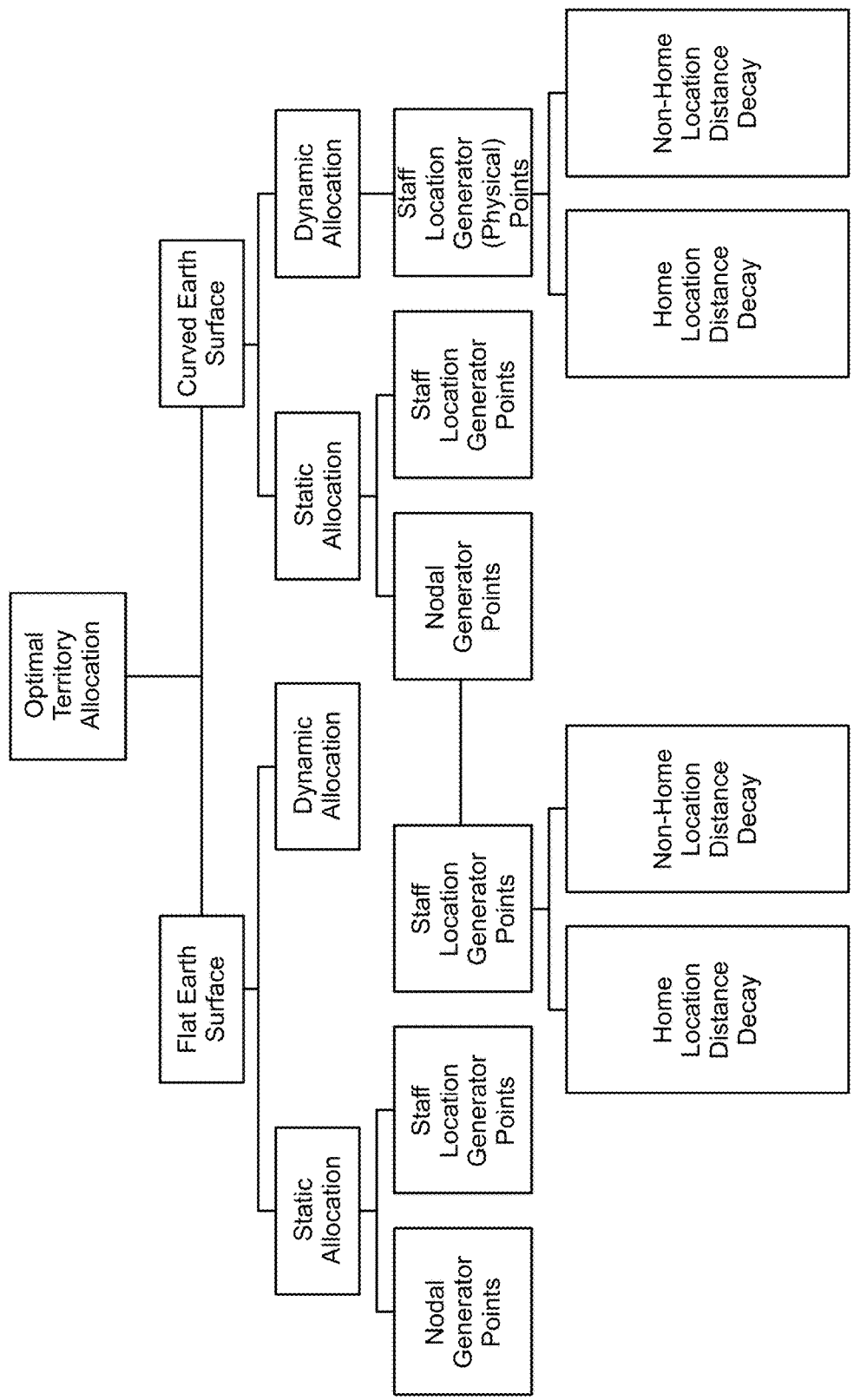
FIG. 6 depicts a collection of solutions hierarchy according to one aspect of the present invention.

FIG. 6 provides a visual representation of this approach. Instead of a Voronoi diagram with colored cells assigned to generator points, the network is partitioned where the red points represent generator points, the white points mark the territory boundaries, and the network components are colored by territory assignment.

Hierarchy and Perspectives of Solutions

FIG. 6 provides a visual representation of the hierarchy of the solutions. It is important to note that a particular solution can be characterized across the following divisions:

(1) Whether corrections for the Earth's curvature are introduced;
(2) Whether the generator points are static or dynamic;
(3) Whether node priority or deployed staff locations are provided as the generator points;
(4) Whether to incorporate a distance decay function based on deployed staff home base location; and
(5) How one measures distance.

For example, the Flat Earth Surface, Static Allocation, Mobile staff Location Generator Points solution refers to an approach which employs Voronoi Tessellation to create deployed staff territories based on the home locations without correcting for the curvature of the Earth's surface.

The following subsections explain the characteristics of each node in the hierarchy.

Flat Earth Surface

Flat Earth Surface solutions assume that the land area of the United States is a flat plane. The advantage here will be computational simplicity across all three Tessellation types (flat, curved and network). The disadvantage will be a suboptimal allocation of territories due to the failure to account for the curvature of the Earth's surface in calculating distances.

Curved Earth Surface

Curved Earth Surface solutions account for the Earth's curvature by assuming that the land area of the United States is a curved (spherical) surface. The advantage here is a nearly optimal solution type as modeling the Earth as a perfect sphere is more accurate than a flat plane model. The disadvantage is computational complexity. For Euclidean distance, this would be O(n)—meaning that computation times grow linearly with increased input spaces (i.e., an increase of 5% in input space will increase computation time by 5%). Whereas for Orthodromic distance, would be O(n$^2$)—meaning that computation times grow as a square of the input space (i.e., an increase of 5% in input space will increase computation time by 25%).

Static Solutions

Static solutions feature fixed territories. The advantages here are computational and operational simplicity. Territories which do not rely on moving generator points will not need to be continually recomputed. Therefore, if the calculation is based on the deployed staff location, this may lead to an inefficient allocation of resources (e.g., deployed staff hours). Also, there would be a lack of accounting for variations based on operational activity.

Dynamic Solutions

Dynamic solutions feature territories whose boundaries evolve based on shifting deployed staff locations. As deployed staff move through space, their associated territory (and those of neighboring deployed staff) will necessarily be continually readjusted. The advantage here is operational flexibility. The flexibility in territory delineation responds to real-time changes in deployed staff location. Disadvantages include the computational complexity inherent in the continual repartitioning of the space. Additionally, this class of solutions introduces the need for further constraints. Specifically, it will be necessary to incorporate a function representing the tolerance level for distances between deployed staff home base locations and the locations of the nodes assigned to them. The importance of such a constraint becomes clear when we imagine a scenario in which a particular deployed staff worker is repeatedly assigned to nodes near the western edge of the dynamically updated territory boundary. For example, this shifts the worker and their associated territory further and further west, which could be considered an inefficient outcome.

Generator Points

Nodal generator points can vary based on application, thus the present invention will treat nodal inputs as generator points for the Voronoi Tessellation across all three types (flat, curved & network). This method will result in static territories (defined by the Voronoi cells) based on node locations rather than deployed staff locations. The static nature of this Tessellation reduces computational complexity, which is advantageous; however, this approach also brings disadvantages.

Under these conditions, multiple deployed staff could fall within the same territory. Acknowledging that assigning multiple deployed staff to the same node is not optimal, we note that it is still possible in this scenario to identify the nearest deployed staff according to the chosen distance metric.

A second disadvantage can be understood by the possibility that, under this approach, the Voronoi cell for a given node could contain no deployed staff. However, the nearest deployed staff worker can still be identified according to a given distance metric.

Mobile Staff Location

Mobile staff Location focused solutions will treat Mobile staff Locations as generator points for the Voronoi Tessellation. One advantage here is the ability to consider dynamic solutions. Mobile staff move; therefore, the territories established via the Tessellation will be constantly shifting (dynamic). Also, in this scenario, you will never have a case where more than one worker could be assigned to an event at a node, because each node would fall within the Voronoi cell of only one deployed staff. As mentioned previously, when using nodes as generator points, we could haves a case in which node is not assigned any deployed staff.

The disadvantage stems from the possible scenario in which multiple incidents fall within the same territory. There could be many deployed staff available, but only the closest deployed staff worker would be assigned to each node, regardless of whether they are occupied.

Probabilistic Distance Decay

Non Adjusted

Distance Decay Non-Adjusted solutions are a subset of dynamic solutions. These do not introduce a penalty for the distance between the deployed staff's current location and their Home Location, as described above. The advantage here is computational simplicity. The disadvantage would be the nonnegligible probability that deployed staff would end up far away from their Home Location. This situation could lead to operational inefficiencies.

Adjusted

Distance Decay Adjusted solutions are a second subset of dynamic solutions. These do account for the distance between the deployed staff's current location and the location of their Home Location. This is accomplished by introducing a function that penalizes the assignment of deployed staff to nodes deemed far from the home base. The advantage here would be an expected reduction in the probability that deployed staff strays too far away from their Home Location. The disadvantage here is additional computational complexity.

Disciplines

Considering Mobile Staff Specialization

It is highly conceivable that all deployed staff would not possess the expertise to adequately address the actions required at each node. Therefore, consideration must be given to the need to route deployed staff only to those nodes for which they possess the required skillset. This fact introduces several new complexities, some of which will be specific to the disciplines themselves. Some considerations in this regard include:

Number and Complexity of Skills/Disciplines

The variety and complexity of the skills required to adequately complete an action at a given node must be adequately captured to ensure the ability of the system to effectively route. Assuming deployed staff locations, home locations and nodal priority are known, the system will capture deployed staff knowledge and aggregate nodal activity efficiency as additional criteria in its routing process. This will enable the system to get smarter with each successive route, as it can consider deployed staff efficiency in addition to availability and travel distance. Additionally, as the system gets smarter over time, knowledge of how efficient certain staff are at completing specific tasks will also inform the routing. The ability to send the most proficient resources to a given node enables the collective system to be as efficient as possible at completing required tasks.

Ability/Complexity of Acquiring New Skills

In other instances, skills may require training, certifications, required service hours to adequately obtain. In the cases where this information resides in other systems, integrations may be used to connect said systems to the present invention to automate such consideration. In cases where this information is not readily tracked or available, consideration will be considered and stored in the present invention to track and consider these factors. The system will also be able to leverage its own data on how well staff perform certain tasks (e.g., in terms of time, and accuracy) to account for proficiency of acquired skills.

Staff Seniority and Non-Knowledge Factors

Certain other factors, such as seniority or other factors not directly attributable to a particular deployed staff worker's ability to perform the job may also factor in. Mobile staff driven factors (e.g., sick leave, vacation, etc.) may also play a role and the system will be designed to receive and consider these factors in its routing algorithm as well. Additionally, unionized staff seniority may also be a factor to consider as well, which can be another parameter assigned to a staff member and used to help shape their work plans, accommodate preferences, and shape decisions on nodes closest to home toward the end of a work day.

Additional Factors

Figure 7:
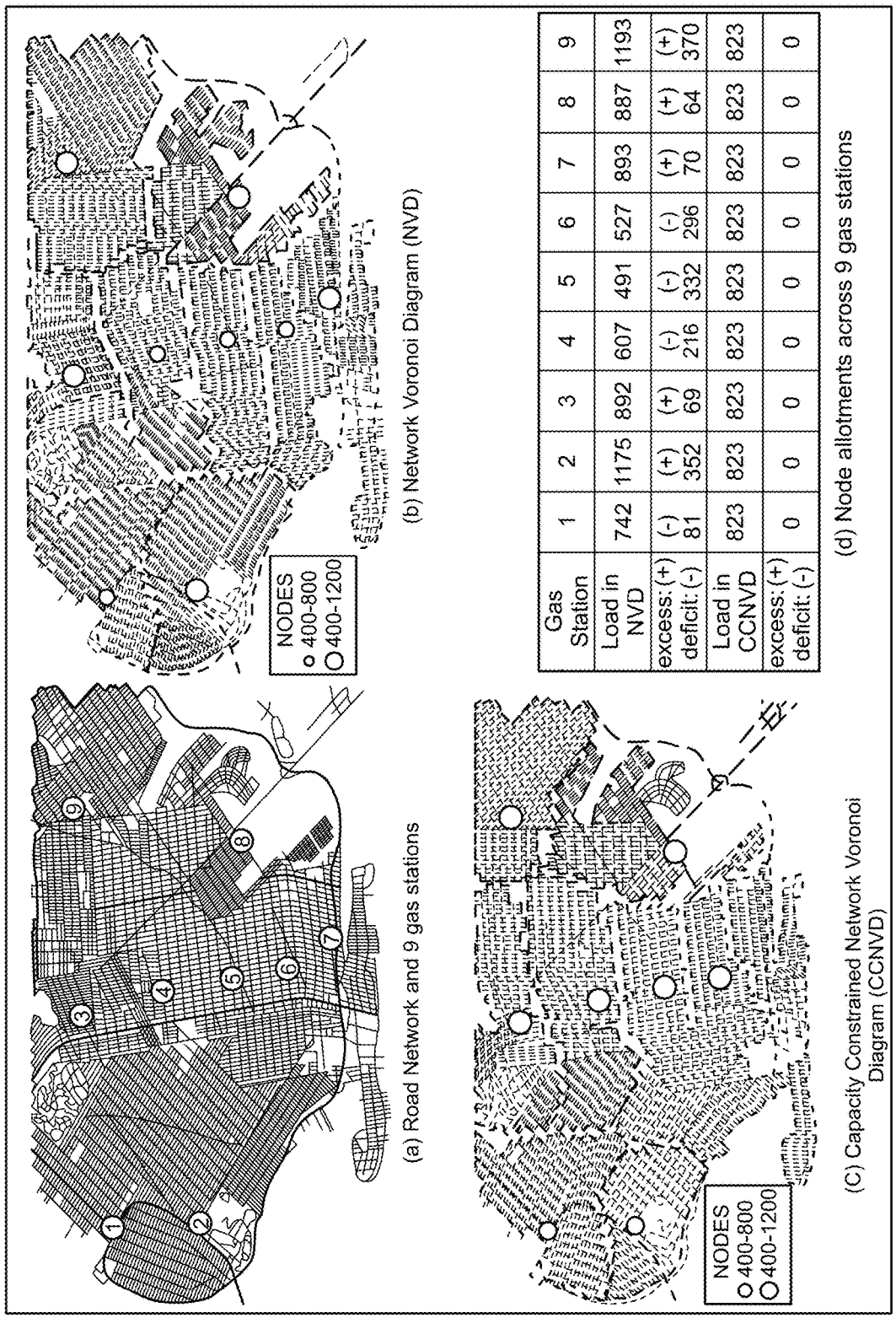
FIG. 7 depicts a demonstration of the effect of introducing capacity constraints (use of gas station) into the Network Voronoi Tessellation of a metropolitan road network using the locations of gas stations as generator points (Shekhar & Kwang-Soo, 2017), wherein the incorporation of further constraints relevant to the optimal allocation of territories is explored using the Zermelo-Voronoi Tessellation for dynamic partitioning.

In order to have the most optimal allocation of nodes, additional constraints should be considered. These factors include operational activity, traffic patterns and prioritization. These factors are introduced as constraints. Shown in FIG. 7 is an example in which capacity constraints are introduced into the Tessellation of a road network. FIG. 7 depicts a demonstration of the effect of introducing capacity constraints (use of gas station) into the Network Voronoi Tessellation of a metropolitan road network using the locations of gas stations as generator points (Shekhar & Kwang-Soo, 2017). The incorporation of further constraints relevant to the optimal allocation of deployed staff territories is explored using the Zermelo—Voronoi Tessellation for dynamic partitioning.

FIG. 7 illustrates two methodologies (NVD & CCNVD) used to optimally allocate service areas for gas stations based on their locations within the road network of a metropolitan area. Map (a) shows the road network and gas stations which serve as generator points before the network is partitioned. Map (b) shows the result of a Voronoi Tessellation based on network distance alone. Map (c) shows the Voronoi diagram for a Tessellation which accounted for both network distance and a capacity constraint (e.g., number of cars using gas station).

Figure 8:
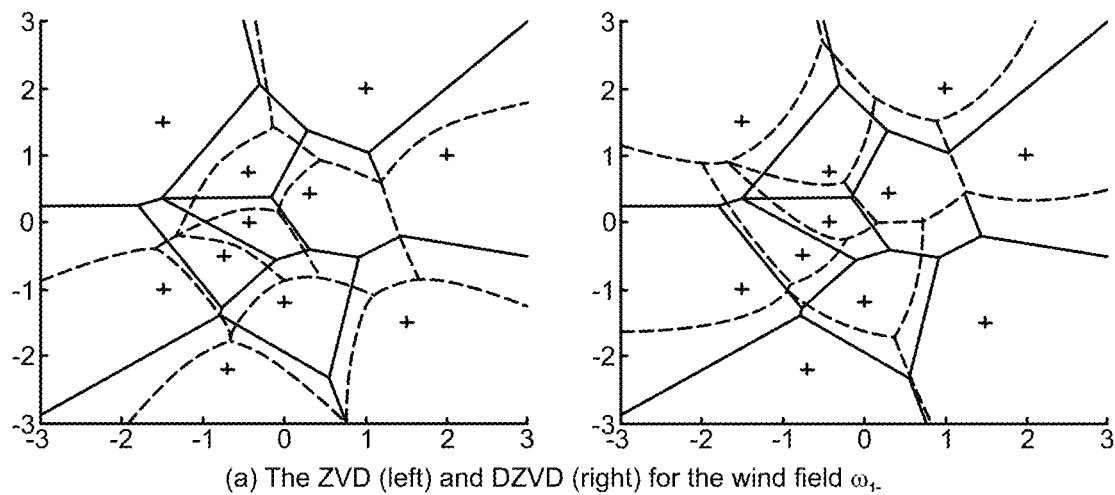
FIG. 8 depicts an example of jittering behavior of dynamically updating inspection territories, wherein the plus sign represents home base, blue line represents starting territory—black shifts—read figure left to right; top to bottom (Dynamic and Control Systems Laboratory, Georgia Tech Aerospace Engineering, 2016).
Figure 8:
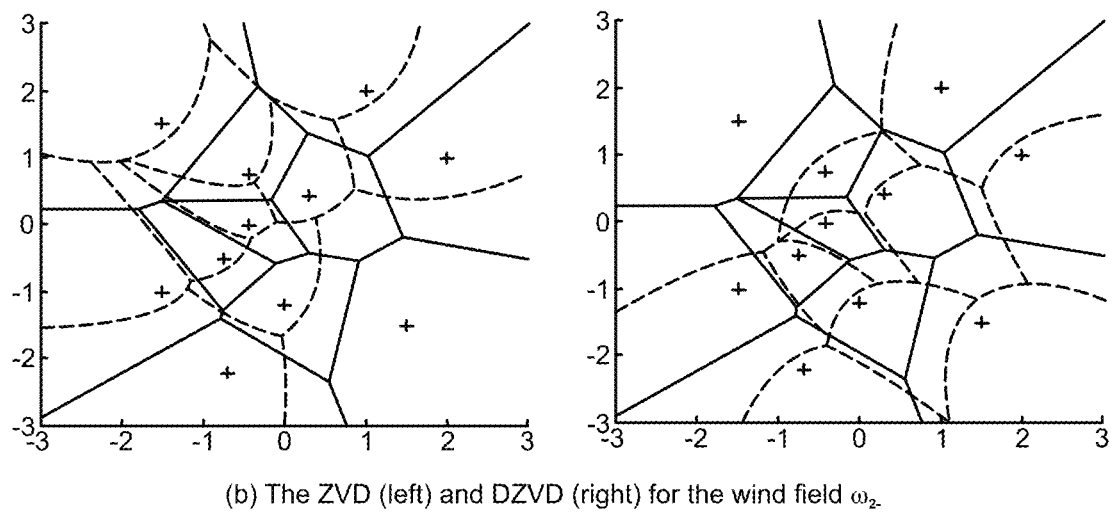
Figure 9:
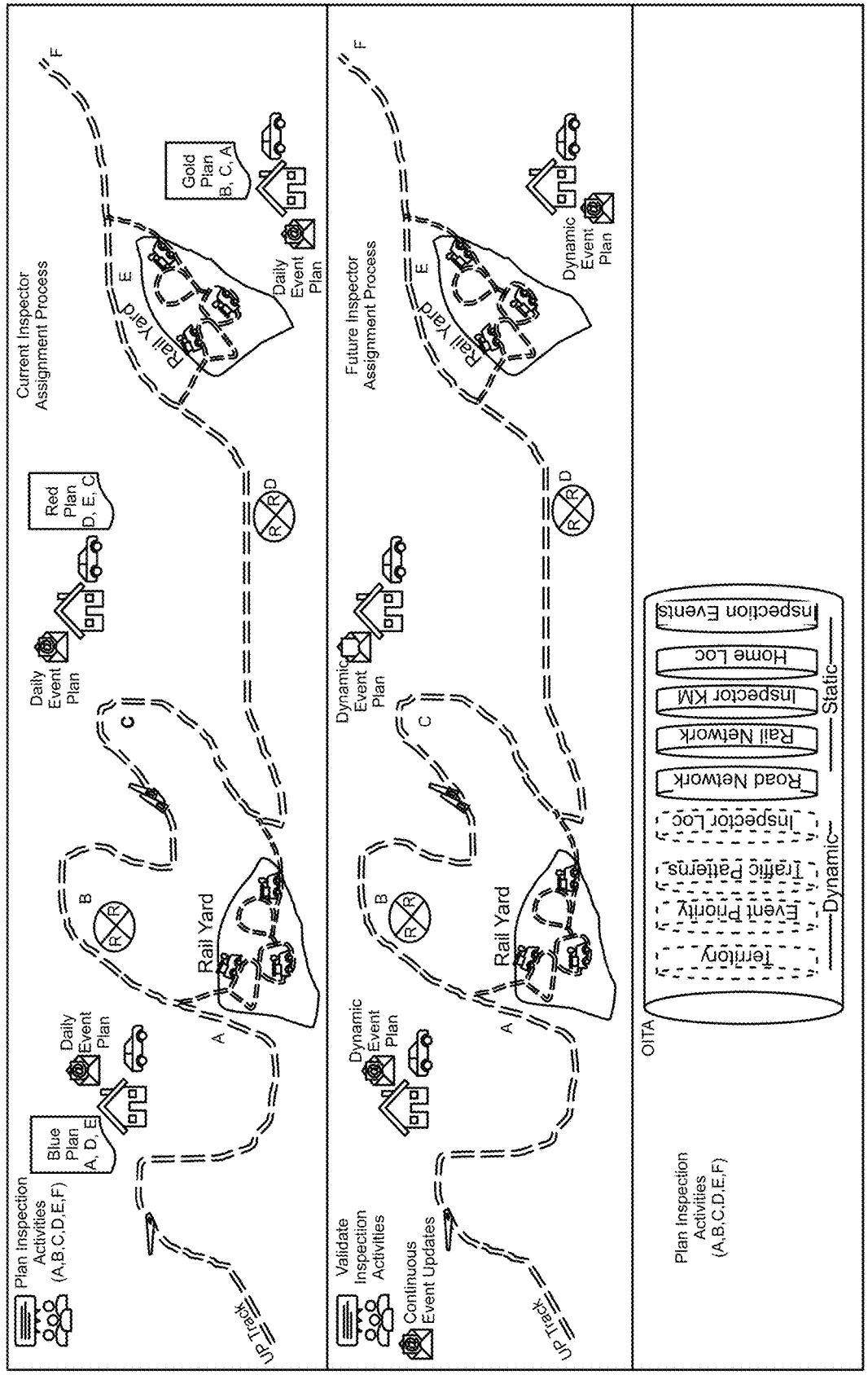
FIG. 9 depicts a simulation of standard inspection planning versus the system of the present invention, showing the many variables the present invention automatically considers, in real time prior to determining the next optimal nodal location.

Previously, it was noted that dynamic solutions introduce computational complexity to the static Tessellation problem. Here, is provided further details on the dynamic process. Firstly, the dynamic Tessellation of a space requires a modification of the Voronoi Tessellation known as the Zermelo-Voronoi Tessellation. The Zermelo-Voronoi variant allows for Tessellations of the same space (or network) that change as a function of time. As mentioned above, this approach is desirable if one seeks to assign territories based on deployed staff location rather than node location. FIG. 8 shows the jittery behavior of the territories shifting in space and time, based on the constraints being introduced (e.g., distance decay—moving too far away from home base).

Node Assignment System

All nodal activities consist of two distinct components: planned activities and unplanned activities. Planned activities are organized over specific time periods (e.g., weekly plans, monthly plans, yearly plans). Unplanned activities occur due to unforeseen incidents, such as accidents. The allocation of deployed staff hours towards unplanned activities constitutes a deviation from the allocation of hours towards planned activities. This becomes significant with respect to dynamic solutions as it translates into a desirable constraint to build into the overall multi-objective optimization process that allocates nodal territories.

The node assignment ensures that deployed staff do not find themselves too far away from their home base. Unacceptability with respect to distance between Home Location and eventual node location can be addressed by incorporating a probabilistic distance decay function that penalizes potential nodal locations in the assignment queue based on their distance from the Home Location. Ideally, the considerations that would dictate the specific parametrizations of these distance decay functions are determined on a discipline-specific basis on account of their idiosyncratic concerns.

Therefore, distinct territory allocation and node assignment are provided for each discipline. The location of each deployed staffer's Home Location dictates the specific initial territory which would contain planned nodal activities. The nodes for which deployed staff are responsible occur based on the ordinary Voronoi Tessellation of the road and highway network that deployed staff use for the purposes of transportation.

Planned components of nodal activities have certain characteristics in common. For the purposes of the routing plan, time is assumed to be discrete. Thus, the duration of the plan is divided into units such as days, shifts, hours, etc. Node assignments are associated with specific units within such a discretized time duration.

Mobile staff begin at their Home Location, which generates a particular territory that contains within itself a number of nodes where actions are to take place. Subsequently, a next node location is assigned to each deployed staffer, which in turn generates a corresponding territory. The newly generated territory, in turn, contains a number of nodes at which nodal activities occur and are assigned. Each of these nodes implies the generation of potential territories that themselves contain a number of nodes, and so on.

It is important to note that this process occurs simultaneously for all deployed staff within a particular discipline and thus constitutes a large-scale multi-objective optimization problem. Each discipline establishes its own penalty for distance from Home Location. These penalty formulations become inputs to the distance decay functions used to ensure that deployed staff do not end up unacceptably far from their Home Locations.

Impact of Operational Activity to Mobile Staff Location

Operational activity is not uniformly distributed. This has important implications for deployed staff Home Locations, since under a dynamic nodal territory allocation paradigm, such locations generate initial destinations requiring activity. For example, an initial territory may cover most of the state of Wyoming, with the easternmost county in the state containing a yard that is used heavily and the westernmost county in the state containing a yard that is used lightly. Thus, different Home Locations could generate initial nodes with significant differences in volume. Therefore, the incorporation of data on operational activity could enhance the optimality of nodal generation based on home location.

Impact of Estimated Traffic Volumes

Another factor considered is the estimated traffic volumes between points within the road and highway network. This factor is particularly important under a dynamic territory allocation paradigm. It has significant implications for the ability to incorporate several data sets to achieve their intended objective of globally maximizing transportation efficiencies.

There are several data sets, both proprietary and publicly available, that contain historical traffic volumes. Examples of such sources are Uber Movement, Waze, and Mapbox. Most of these data sources also include point estimations and estimation ranges of the traffic volume at future points in time. In the absence of readily available projections of future traffic volumes, the historical data can be analyzed to develop predictions.

These traffic volume predictions may be incorporated into the U.S. road and highway network graph as weights. With such an approach, changes in anticipated traffic volumes will manifest as changes in the values of the weights associated with edges that define the territory boundaries. This allows for the incorporation of both travel distance and travel time as components of the deployed staff transportation cost. For example, a slightly longer route in distance may incur less overall cost than a shorter route with double the traffic volume.

Such modifications to the structure of the network informs the optimal routing territory allocation.

Flat Earth Surface—Dynamic Allocation—Node Location Generator Points—Distance Decay Adjusted Nodal Event Assignment One of the primary motives behind the consideration of a solution that is unconstrained by the organizational constraints is the need to maintain a contingency mechanism for emergency conditions that would occur during disastrous events.

In such situations, computational efficiency becomes a paramount concern. Due to this, flat earth surface Voronoi Tessellations are proposed over curved earth surface Voronoi Tessellations. The possibility of unforeseeable response actions necessitates dynamic allocation solutions. The situational imperatives of disastrous events necessitate territorial allocations generated via generator points based on deployed staff locations in real time. Finally, the situational imperatives of disastrous events also justify the de-prioritization of deployed staff preferences regarding thresholds of acceptability for distance from Home Location, thereby necessitating Distance Decay Adjusted Nodal Event Assignment.

Figure 10:
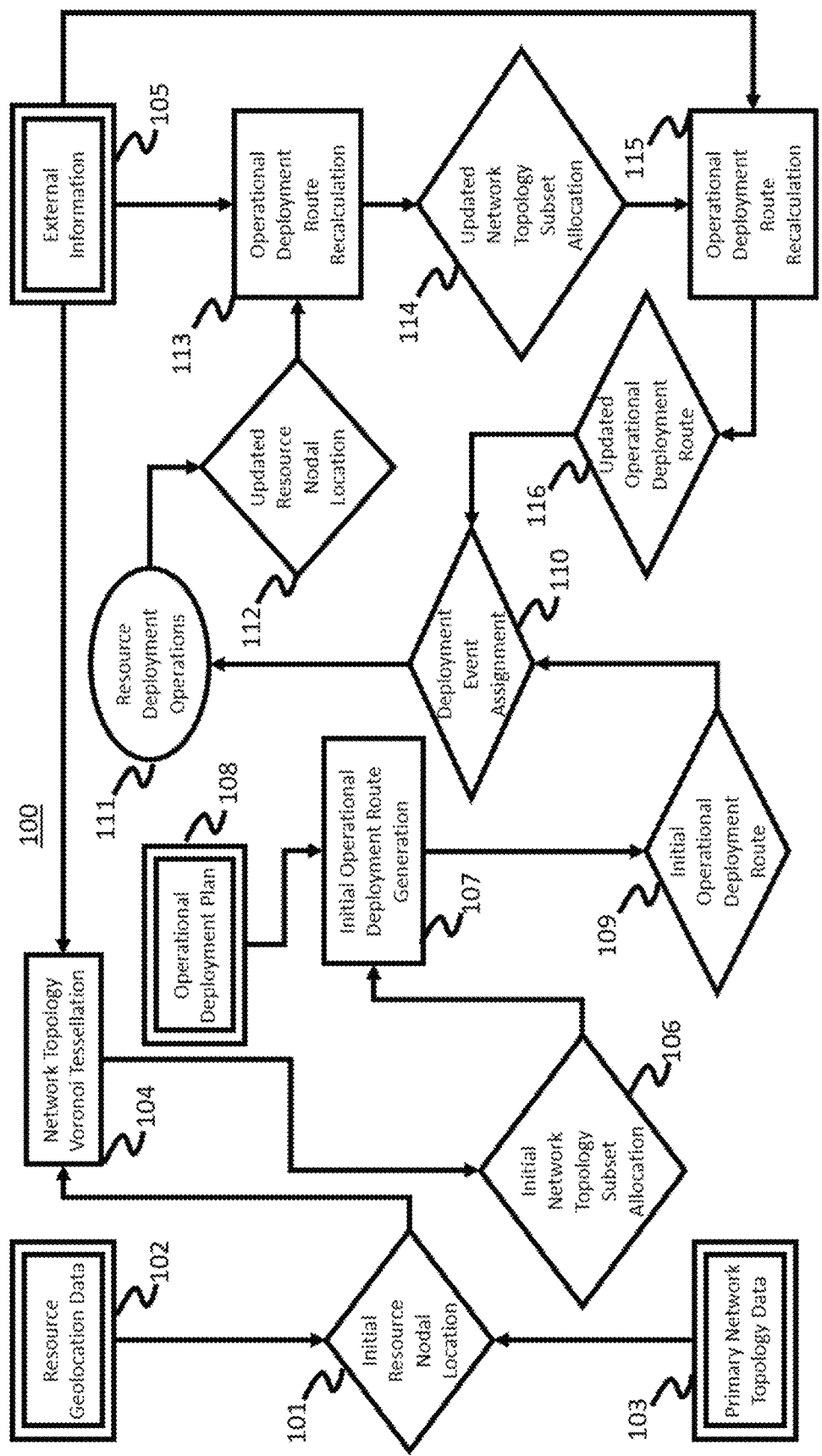
FIG. 10 depicts an exemplary embodiment of a method for allocating resources according to one aspect of the present invention.

Turning to FIG. 10, shown therein is an exemplary embodiment of a method for allocating resources. Elements 102, 103, 105 and 108 represent raw data inputs.

Element 102 represents resource geolocational data, which is geocoordinate data in terms of latitude and longitude of the location of resources deployed in the field. Element 103 represents primary network topology data, which is graph network data of all nodes and edges in the primary network, e.g., all intersections and connections between intersections in the United States highway and road network. Element 108 represents the operational deployment plan, which is a combination of initial resource geolocational data and temporal data detailing the dates and times for all planned activities of resources deployed in the field. Element 105 represents external information, which is other sources of information that modify the topology of the primary network, e.g., traffic pattern data.

Elements 101 and 112 represent intermediate data generated by either the system or resource activities. Element 101 represents initial resource nodal location data, which is a combination of resource geolocational data and primary network topology data that specifies the position of resources deployed in the field in terms of the nodes of the network topology occupied by them. Element 112 represents updated resource nodal location data, which is a combination of resource geolocational data and primary network topology data that specifies the position of resources deployed in the field in terms of the nodes of the network topology occupied by them after receiving and acting upon the instructions provided by the system.

Elements 104, 107, 113 and 115 represent specific points of algorithmic processing undertaken by system. Element 104 represents the network topology Voronoi Tessellation, which is the generation of Voronoi Tessellation of the network topology represented by the primary network topology data 103. Element 107 represents the initial operational deployment route generation, which is generation of the optimal route between origin nodal location and deployment event nodal location—as determined by the initial network topology subset allocation generated by the Voronoi Tessellation of the network topology represented by the primary network topology data 103 and the operational deployment plan 108—that is to be followed by resources deployed in the field in the course of their operations. Element 113 represents the operational deployment route recalculation, which is the recalculation of the optimal route between origin nodal location and deployment event nodal location—as determined by the updated resource nodal location 112 and the modification to the network topology resulting from the incorporation of external information 105, and the updated network topology subset allocation 114—that is to be followed by resources deployed in the field in the course of their operations.

Element 110 represents the process stage where system provides deployed resources with instructions. Element 110 represents the deployment event assignment, which is the assignment of a deployment event nodal location by the system to resources deployed in the field.

Element 111 represents actual activities undertaken by resources as per system instructions. Element 111 is resource deployment operations, which is transportation of resources deployed in the field from an origin nodal location to a deployment event nodal location within the network topology.

Elements 106, 109, 114 and 116 represent results of algorithmic processing undertaken by system. Element 106 represents the initial network topology subset allocation, which is allocations of specific subsets of the network topology as generated by the network topology Voronoi Tessellation 104 to specific resources deployed in the field.

Element 109 represents the initial operational deployment route, which is the optimal route between origin nodal location 101 and deployment event nodal location 110—as determined by the initial network topology subset allocation 106 generated by the Voronoi Tessellation of the network topology 104 represented by the primary network topology data 103 and the operational deployment plan 108—that is to be followed by resources deployed in the field in the course of their operations. Element 116 represents the updated operational deployment route, which is the recalculated version of the optimal route between origin nodal location 110 and the next deployment event nodal location—as determined by the updated resource nodal location 112 and the modification to the network topology resulting from the incorporation of external information 105—that is to be followed by resources deployed in the field in the course of their operations. Element 114 represents updated network topology subset allocation, which is the recalculated Voronoi Tessellation of the network topology based on the updated resource nodal locations 112 and the operational deployment route recalculation 113.

Voronoi Tessellation

Within the usual Euclidean space, the definition of the Voronoi Tessellation is as follows:

Each Voronoi polygon $R_k$ is associated with a "generator point" $P_k$. Let X be the set of all points in the Euclidean space. Let $P_1$ be a point that generates its Voronoi cell $R_1$, $P_2$ be a point that generates its Voronoi cell $R_2$, and so on up to $P_n$ be a point that generates its Voronoi cell $R_n$. Then, "all locations in each Voronoi cell are closer to the generator point of that cell than to any other generator point in the Voronoi diagram of the Euclidean plane." [Tran, et al].

Given the assumption of an Euclidean plane, the notion of "closer" derives from the Euclidean distance function, where the distance between points can be measured by:

$$l_2 = d[(a_1,a_2),(b_1,b_2)] = \sqrt{(a_1-b_1)^2 - (a_2-b_2)^2}$$

See FIG. 1, which shows an example of a Tessellation process using Euclidean distance function.

Manhattan Distance:

Another useful distance metric to use in the Tessellation process is the Manhattan Distance, defined as:

$$d[(a_1,a_2),(b_1,b_2)] = |a_1-b_1| + |a_2-b_2|$$

See FIG. 3 which shows an example of a Tessellation process using Manhattan Distance. The Manhattan Distance (also known as the $L_1$ Norm) is the distance metric used in Taxicab Geometry. It is distinct from Euclidean Geometry in that distances between two points account for an underlying grid (such as the grid layout of city streets). Since deployed staff transportation would primarily occur on road networks, the Manhattan Distance between two points is a better representation of the cost (e.g., travel time) involved in transporting deployed staff between them. Consequently, Tessellations formed using the Manhattan Distance between generator points, in turn, are more realistic allocations of territories.

Figure 4:
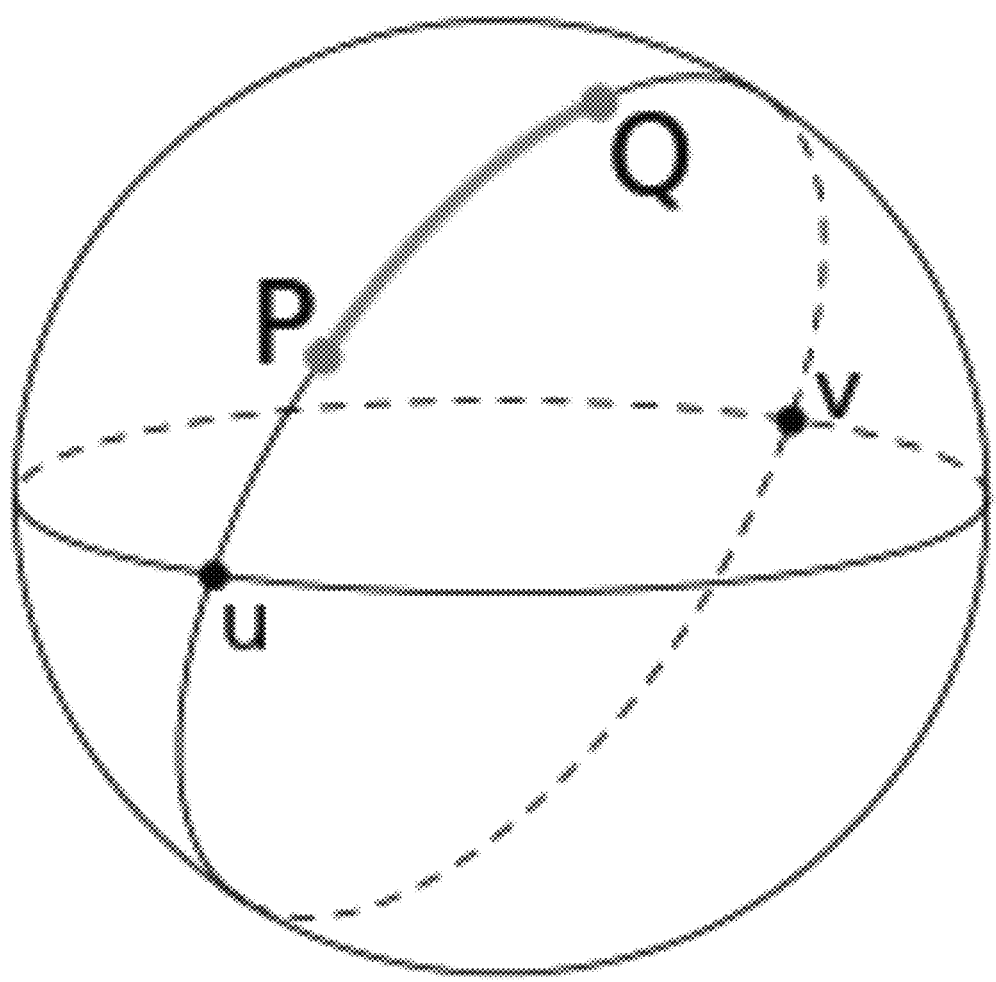
FIG. 4 depicts connecting paths between two points on a curved (spherical) surface (Wikimedia Foundation, 2016).

However, failing to account for the curved nature of the Earth's surface can also lead to a suboptimal allocation of territories. This is because distances between two points on the Earth's surface follow a curved path, rather than a straight line as illustrated in FIG. 4.

Great Circle or Orthodromic Distance:

Determining the distance between two points that lie on such curved surfaces requires recognizing the path between them as a Geodesic on an ellipsoid. In the interest of simplification, the shape of the Earth can be assumed to be approximately spherical, in which case geodesics on its surface are reduced to the special case of Great Circles on a sphere.

Then, the Great Circle, or Orthodromic Distance between two locations on the Earth's surface can be calculated as shown below.

It is first necessary to determine the central angle between the two locations. Once determined, it can be used to calculate the Great Circle distance between the two locations in question.

The Great Circle (Orthodromic Distance) Calculation

Let $\lambda_1, \phi_1$ and $\lambda_2, \phi_2$ be the geographical longitude and latitude in radians of two points 1 and 2, and $\Delta\lambda, \Delta\phi$ be their absolute differences; then, the central angel between them, is given by the spherical law of cosines if one of the poles is used as an auxiliary third point on the sphere:

$$\Delta\sigma = \sin^{-1}(\sin\phi_1 \sin\phi_2 + \cos\phi_1 \cos\phi_2 \cos(\Delta\lambda))$$

The problem is normally expressed in terms of finding the central angle Au. Given this angle in radians, the actual arc length d on a sphere of radius r can be trivially computer as $$d = r\Delta\sigma$$

A final perspective to consider is one that approaches the problem from a network theory perspective. This is predicated on the understanding that deployed staff rely largely on the U.S. Road and Highway system to travel to their assigned nodes. All road and highway systems can be considered as weighted network graphs. As a result, instead of performing Tessellations that span across the entirety of the U.S. land area, a network Tessellation might only take into account all the pathways that deployed staff can actually take to get to their assigned location. This disregards potentially large swathes of land area (e.g., lakes, forested areas, mountainous peaks) where deployed staff most likely would not travel.

Weighted Network Graph:

Under the weighted network graph framework, the nodes of the network represent specific geolocations. The edges connecting adjacent nodes of the network represent subsections of the system of roads and highways. The weights associated with the edges connecting adjacent nodes of network represent the cost involved in transportation between the two geolocations that comprise the beginning and end points of such subsections. Additionally, this framework representing the U.S. Road and Highway system can conveniently incorporate real-world considerations, such as differences in speed limits and expected traffic volumes, to modify baseline transportation costs between geolocations by factoring their impact into the weights of the edges involved accordingly.

Figure 5:
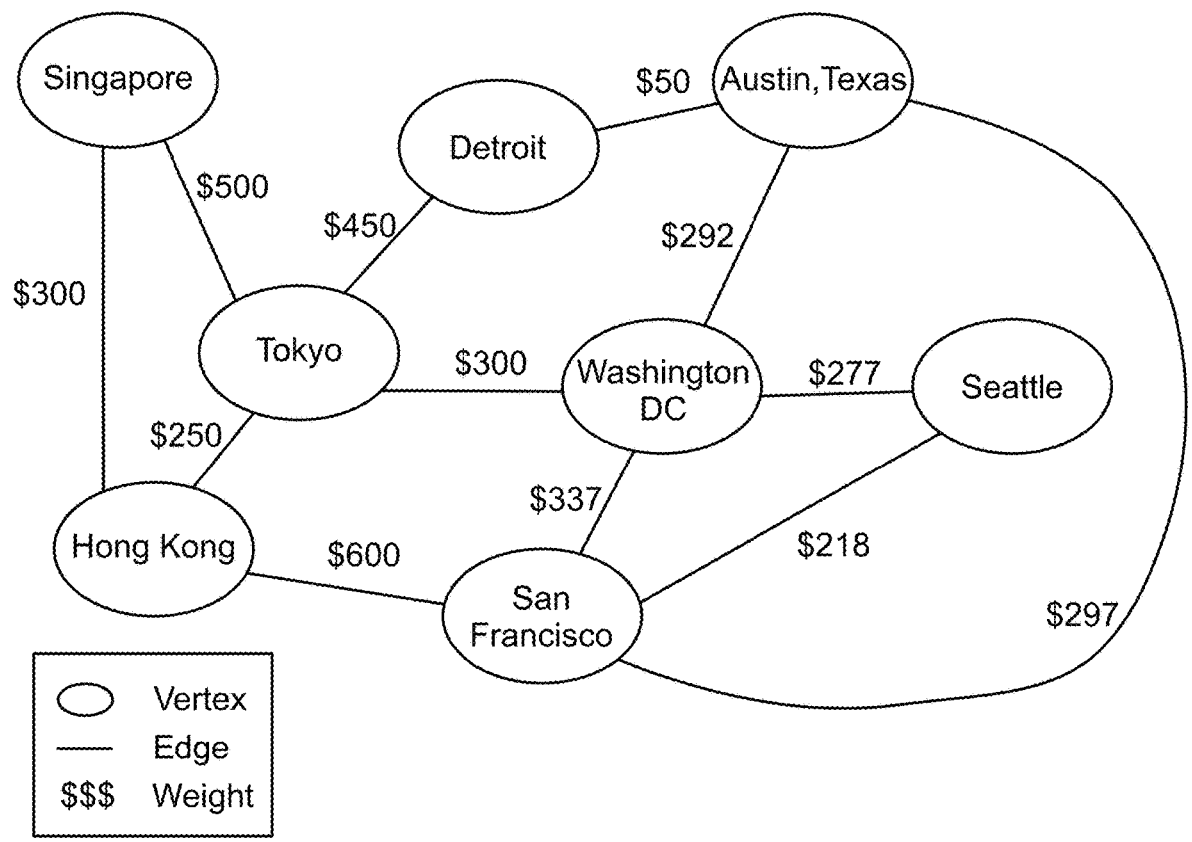
FIG. 5 depicts an example of a Weighted Network Graph Framework—World cities with city locations representing nodes in the network, edges that connect nodes in the network with edge weights being represented by transportation costs in the form of flight prices (Ngo, 2017).

A weighted network graph framework is a generalized, more flexible extension of the grid-based approach that employs the Manhattan Distance. The grid points involved would not be fully connected. When connected, the weights associated with the edges involved would be variable rather than constant. FIG. 5 shows an example of a Weighted Network Graph Framework—world cities with city locations representing nodes in the network, edges that connect nodes in the network with edge weights being represented by transportation costs in the form of flight prices.

Zermelo-Voronoi Tessellation:

The application of the Zermelo-Voronoi Tessellation to dynamically evolving partitions of spaces or weighted network graphs is best described by Bakolas & Tsiotras in their paper titled "Optimal Pursuit of Moving Targets using Dynamic Voronoi Diagrams" which states:

Voronoi-like partition problems for a set of moving generators in the plane, known in the literature as dynamic partition problems, constitute a class of challenging problems in dynamic computational geometry. They have received a considerable amount of attention recently owing to their applicability in deployed network and multiagent problems. One of the fundamental questions in this framework, deals with the characterization of the proximity relations between the moving generators (i.e., agents) and the points in the plane as time evolves. In contrast to the standard Voronoi partitioning problem, where all generators are stationary, the solution of the dynamic partition problem consists of a sequence of time-evolving Voronoi diagrams. A diagram of this time-evolving data structure at a particular instant of time is a standard Voronoi diagram with respect to the positions of the moving Voronoi generators at that time.

(Bakolas & Tsiotras, 2010)

What is claimed is:

1. An artificial intelligence enhanced method for determining an optimal allocation of field resources comprising:
   a) determining an initial network topology subset allocation using network topology Voronoi Tessellation based on initial resource nodal location, resource geolocational data, external information, and primary network topology data;

b) generating an initial operational deployment route based on the initial network topology subset allocation and an operational deployment plan;
c) assigning deployment of field resources based on the initial operational deployment route;
d) receiving updated resource nodal locations from deployed field resources;
e) recalculating an updated operational deployment route based on the updated resource nodal locations, and additional external information;
f) determining an updated network topology subset allocation based on the updated operational deployment route; and
g) recalculating another operational deployment route based on the updated network topology subset allocation and new external information, and returning to step c) to assign field resources using said another operational deployment route.

2. The artificial intelligence enhanced method according to claim 1, further comprising continuously developing optimal deployment routes based on updated resource nodal locations and repeatedly communicating updated deployment routes to the deployed field resources.

3. The artificial intelligence enhanced method according to claim 2, further comprising capturing and learning from deviations from a suggested route plan to inform future routing recommendations.

4. The artificial intelligence enhanced method according to claim 1, wherein a calculation is performed at each successive nodal point, during which consideration is given for where each deployed field resource is at that specific point in time to determine a best deployed field resource to route to a next node.

5. The artificial intelligence enhanced method according to claim 4, wherein the optimized route calculation is performed again when it is time to determine which deployed field resource goes to a next node, at which time territorial boundaries are then redrawn to achieve a new optimal routing option.

6. The artificial intelligence enhanced method according to claim 5, wherein continuous consideration of a deployed field resource location in reference to each activity occurring at each node provides dynamic, optimized routing for the deployed field resources.

7. The artificial intelligence enhanced method according to claim 6, wherein traffic volume estimation is used to perform the optimized routing for the deployed field resources at each node.

8. A non-transitory computer readable media having stored thereon a plurality of instructions causing an artificial intelligence processor to perform an artificial intelligence enhanced method for determining an optimal allocation of field resources comprising:
a) determining an initial network topology subset allocation using network topology Voronoi Tessellation based on initial resource nodal location, resource geolocational data, external information, and primary network topology data;
b) generating an initial operational deployment route based on the initial network topology subset allocation and an operational deployment plan;
c) assigning deployment of field resources based on the initial operational deployment route;
d) receiving updated resource nodal locations from deployed field resources;
e) recalculating an updated operational deployment route based on the updated resource nodal locations, and additional external information;
f) determining an updated network topology subset allocation based on the updated operational deployment route; and
g) recalculating another operational deployment route based on the updated network topology subset allocation and new external information, and returning to step c) to assign field resources using said another operational deployment route.

9. The non-transitory computer readable media according to claim 8, wherein the instructions further cause the artificial intelligence processor to continuously develop optimal deployment routes based on new input and updated resource nodal locations.

10. The non-transitory computer readable media according to claim 9, wherein the instructions further cause the artificial intelligence processor to repeatedly communicate updated deployment routes to the deployed field resources.

11. The non-transitory computer readable media according to claim 8, wherein the instructions further cause the artificial intelligence processor to perform a calculation at each successive nodal point, during which consideration is given for where each deployed field resource is at that specific point in time to determine a best deployed field resource to route to the next node.

12. The non-transitory computer readable media according to claim 11, wherein the instructions further cause the artificial intelligence processor to perform the optimized route calculation again when it is time to determine which deployed field resource to route to a next node, at which time territorial boundaries are then redrawn to achieve a new optimal routing option.

13. The non-transitory computer readable media according to claim 12, wherein the instructions further cause the artificial intelligence processor to continuously consider deployed field resource location in reference to each activity occurring at each node, which provides dynamic, optimized routing of deployed field resources.

14. The non-transitory computer readable media according to claim 13, wherein the instructions further cause the artificial intelligence processor to consider traffic volume estimation when performing optimized routing for the deployed field resources at each node.

15. An artificial intelligence enhanced apparatus to determine an optimal allocation of field resources comprising:
an artificial intelligence processor to determine an initial network topology subset allocation using network topology Voronoi Tessellation based on initial resource nodal location, resource geolocational data, external information, and primary network topology data;
said artificial intelligence processor to generate an initial operational deployment route based on the initial network topology subset allocation and an operational deployment plan;
a communications device coupled to the artificial intelligence processor to send to a plurality of field resources an assignment of said plurality of field resources based on the initial operational deployment route;
a plurality of global positioning system devices coupled to the communications device, each of which is deployed on one of the plurality of field resources, and each of which is to determine a nodal location for its field resource;
said communications device receiving updated resource nodal locations from deployed field resources via the plurality of global positioning system devices and passing said updated resource nodal locations to said artificial intelligence processor;

said artificial intelligence processor to recalculate an updated operational deployment route based on the updated resource nodal locations, and additional external information;

said artificial intelligence processor to determine an updated network topology subset allocation based on the updated operational deployment route; and said artificial intelligence processor to recalculate another operational deployment route based on the updated network topology subset allocation and new external information, and said artificial intelligence processor to continue to recalculate updated operational deployment routes based on updated resource nodal locations and additional external information using said another operational deployment route.

16. The artificial intelligence enhanced apparatus according to claim 15, wherein the artificial intelligence processor continuously develops optimal deployment routes based on new input and updated resource nodal locations.

17. The artificial intelligence enhanced apparatus according to claim 16, wherein the communication device repeatedly communicates updated deployment routes to the deployed field resources.

18. The artificial intelligence enhanced apparatus according to claim 15, wherein the artificial intelligence processor performs a calculation at each successive nodal point, during which consideration is given for where each deployed field resource is at that specific point in time to determine a best deployed field resource to route to the next node.

19. The artificial intelligence enhanced apparatus according to claim 18, wherein the artificial intelligence processor performs the optimized route calculation again when it is time to determine which deployed field resource to route to a next node, at which time territorial boundaries are then redrawn to achieve a new optimal routing option.

20. The artificial intelligence enhanced apparatus according to claim 19, wherein the artificial intelligence processor continuously considers deployed staff current location in reference to each activity occurring at each node, which provides dynamic, optimized routing.

\* \* \* \* \*